P. P. HEMSTREET.
Tire Heater.
No. 81,633.
Patented Sept. 1, 1868.
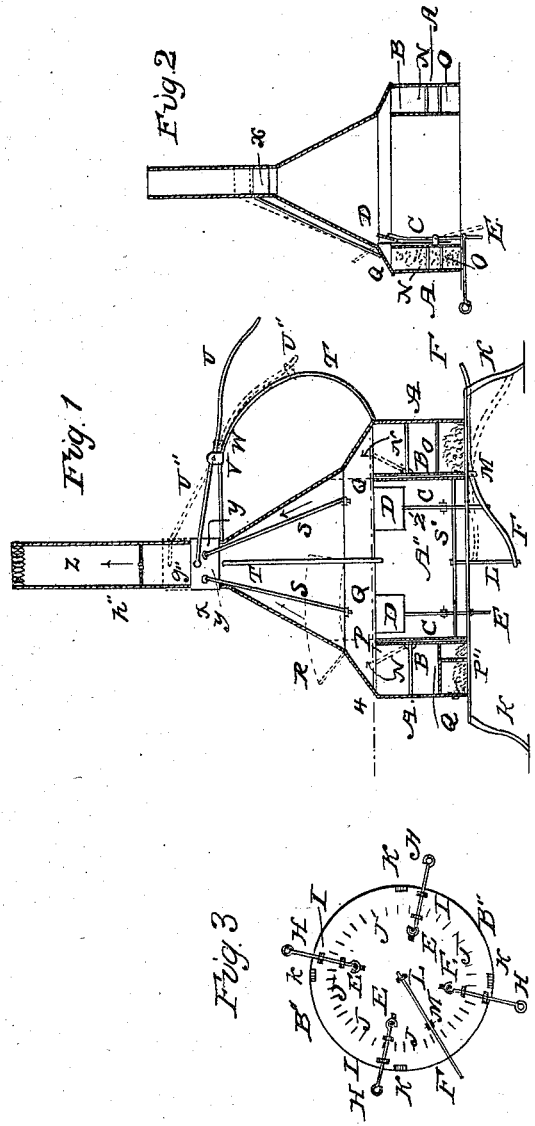
Witnesses
W. B. Richards
J. B. Harsh
Inventor
P. P. Hemstreet

United States Patent Office

P. P. HEMSTREET, OF GALESBURG, ILLINOIS, ASSIGNOR TO HIMSELF AND DAVID GUDTNER, OF SAME PLACE.

Letters Patent No. 81,633, dated September 1, 1868.

IMPROVED TIRE-HEATER.

*The Schedule referred to in these Letters Patent and making part of the same.*

TO ALL WHOM IT MAY CONCERN:

Be it known that I, P. P. HEMSTREET, of Galesburg, in the county of Knox, and State of Illinois, have invented a new and useful Tire-Heater, for heating any kind of tire, for the purpose of expanding the same before putting in place on the wheel; and I do hereby declare the following to be a full, clear, and exact description of the construction and operaton of the same, reference being had to the annexed drawings, making a part of this specification, in which—

Figure 1 is a side plan or view of my machine.

Figure 2 is a sectional view, and

Figure 3 is a view of the bottom.

Similar letters of reference indicate corresponding parts.

The nature of my invention relates to constructing a machine in which tire may be heated much more regular, more rapidly, and with less fuel than by the ordinary method.

To enable others skilled in the art to make and use my invention, I will proceed to the following fuller and clearer description of its construction and operation.

B'' B'', fig. 3, represents the base or bottom plate of my device, which may be formed of any suitable material or size.

A A, fig. 1, represents the outside circular rim raised a suitable height from the bottom plate B.

K K represent legs for supporting the device at suitable distance from the ground or floor.

B, fig. 1, represents an inside raised and stationary rim, about the same height as the outer rim A.

C, fig. 1, represents a movable rim, about the same height as and fitting closely inside of the rim B.

D D represent dampers fitting closely over corresponding openings in the movable rim C.

E E, figs. 1 and 2, represent the rods which are pivoted at T'' T'' for operating the dampers D D, by means of the handles H H passing out beneath the bottom plate, as seen at figs. 2 and 3.

S'', fig. 1, represents the rods crossing each other, lying horizontal, and connected at the ends to the movable rim C, so that when the rods are raised, the rim C will be carried up with them.

L, fig. 1, represents a vertical rod connected at the top to the rods S''.

F, figs. 1 and 3, represents a lever pivoted at M, and extending beyond the periphery of the bottom-plate B'' B'', fig. 3, sufficient to grasp for the purpose of operating.

o o, fig. 1, represent rods connecting the rims A and B, at suitable distance from each other for supporting the tire above the fire, which is made on the bottom plate B'', between the plates A and B.

N N, fig. 1, represent another series of rods similar to o o, only hinged at one end to enable them to be thrown up, as represented by the dotted line P, in order that tire may be placed on the lower series of rods. Then the rods N being turned down to their place, another set of tire may be placed on them, and so other series of hinged rods may be placed above these again.

Z represents the chimney, which is supported in place by the arms T T.

Q Q, fig. 1, represent doors, which may be opened to the position of the dotted line R by means of the lever U, hinged at V, and being drawn down to the position shown by the dotted line U''.

X represents a band passing around the chimney Z in such way that it may be slid up and down on the same, and the lever U is attached to this band for the purpose of operating it.

y y represent, at fig. 1, rods connecting the band X and the doors or plates Q Q, so that the doers Q Q may be opened and closed by means of the lever U, which is held in either position by the slide-ring W.

h'', fig. 1, represents a damper in the chimney Z.

P'', fig. 1, represents a door on the outer rim A, any number of which may be provided for the purpose of placing fuel on the fire, cleaning out, &c.

J J J, fig. 1, represent a series of holes in the bottom plate B'' B'' for the purpose of supplying air to support combustion:

The manner of operating my machine is as follows:

First, by bringing the lever U down to the dotted-line position, and thereby throwing open the doors Q Q, the fuel may then be placed in position, and the tire may also be slid in, on the red line 4, and dropped into place. The doors Q are then closed, and the movable rim C lowered by means of the lever F. The damper $h$ then being opened, all is favorable to support the most rapid combustion, and in case the progress of the fire should want to be checked almost entirely, the damper $h''$ may be closed, and the movable rim C slid up until it strikes the under side of the doors Q Q, thus cutting off all draught entirely, and keeping the tire warm any reasonable length of time necessary.

Should any part of the tire be found to not be hot enough, it may be brought up by opening the damper $h''$, keeping the movable rim C up and close to top, and opening that one of the dampers D next the cold place, thereby giving draught at that point, and thus bringing the heat to the desired place.

The doors or lids Q may, if desired, be operated with slides in place of hinges.

What I claim as new, and desire to secure by Letters Patent, is—

1. The outer rim A, bottom B, lids Q, chimney Z, lever U, rods S, band X, bars N $o$, and inner rim B, all constructed, arranged, and combined as described and for the purpose set forth.

2. The dampers D, rods T and S'', and lever F, with rods L and H, and rim C, constructed and arranged as described, and combined with rim B and A and bottom B, substantially as described, and for the purpose set forth.

Dated, this 23d day of June, 1868.

P. P. HEMSTREET.

Witnesses:
W. B. RICHARDS,
J. B. MARSH.